US011157940B2

(12) United States Patent
Gaidon et al.

(10) Patent No.: US 11,157,940 B2
(45) Date of Patent: Oct. 26, 2021

(54) INCENTIVIZED DATA TRANSFER DURING VEHICLE REFUELING

(71) Applicant: Toyota Research Institute, Inc., Los Altos, CA (US)

(72) Inventors: Adrien D. Gaidon, Mountain View, CA (US); Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/047,801

(22) Filed: Jul. 27, 2018

(65) Prior Publication Data

US 2020/0034871 A1    Jan. 30, 2020

(51) Int. Cl.
*G06Q 30/02* (2012.01)
*G07C 5/00* (2006.01)
*G07F 15/00* (2006.01)
*G07C 5/08* (2006.01)
*B60L 53/66* (2019.01)

(52) U.S. Cl.
CPC ........ *G06Q 30/0238* (2013.01); *B60L 53/665* (2019.02); *G07C 5/008* (2013.01); *G07C 5/0841* (2013.01); *G07F 15/001* (2013.01); *G07F 15/006* (2013.01)

(58) Field of Classification Search
CPC ........... G06Q 30/0207; G06Q 30/0238; G06Q 20/145; G06Q 20/20; G06Q 20/387; B60L 53/66; B60L 53/665; G07F 15/006; G07F 15/001; G07C 5/008
USPC ................................ 705/14.24, 14.35, 14.13
See application file for complete search history.

(56) References Cited

U.S. PATENT DOCUMENTS

| 7,219,071 | B2 | 5/2007 | Gallagher |
| 7,991,665 | B2 | 8/2011 | Hafner et al. |
| 8,090,598 | B2 * | 1/2012 | Bauer .................... G06Q 40/02 705/4 |

(Continued)

OTHER PUBLICATIONS

Christina Lockwood, nonda Partnership with CarBlock Enables Users to Earn Rewards Through Sharing Vehicle Data, published on Apr. 17, 2018, Business Wire (Year: 2018).*

(Continued)

*Primary Examiner* — Scott D Gartland
*Assistant Examiner* — Melinda Gieringer
(74) *Attorney, Agent, or Firm* — Christopher G. Darrow; Darrow Mustafa PC

(57) ABSTRACT

The systems and methods described herein disclose providing compensation for data transmission during a refill event. As described here, a vehicle collects operation data sets during movement in the vehicular environment. Vehicles can then transfer one or more of the operation data sets during the refill of the collecting vehicle. Thus, operator can determine the desirability and value of trading the upload time for compensation. The systems and methods can include detecting a refill event for a collecting vehicle. A data analysis can then be received for one or more operation data sets produced by the collecting vehicle. A data value can then be determined from the data analysis, with the operator determining transfer one or more operation data sets from the collecting vehicle during the refill event. Once received, compensation can be provided to the collecting vehicle for the received operation data sets based on the data value.

17 Claims, 7 Drawing Sheets

(56) References Cited

U.S. PATENT DOCUMENTS

| | | | |
|---|---|---|---|
| 8,725,551 B2 | 5/2014 | Ambrosio et al. | |
| 2003/0033154 A1 | 2/2003 | Hajdukiewicz et al. | |
| 2003/0065630 A1* | 4/2003 | Brown | B67D 7/348 |
| | | | 705/413 |
| 2007/0124046 A1 | 5/2007 | Ayoub et al. | |
| 2007/0250452 A1 | 10/2007 | Leigh et al. | |
| 2010/0241470 A1* | 9/2010 | Smith | G06Q 10/087 |
| | | | 429/61 |
| 2011/0011930 A1* | 1/2011 | Starr | G07F 17/42 |
| | | | 235/382 |
| 2011/0015821 A1* | 1/2011 | Tran | B60L 53/14 |
| | | | 701/31.4 |
| 2011/0061981 A1* | 3/2011 | Oh | B60L 53/16 |
| | | | 191/12.2 R |
| 2011/0227531 A1* | 9/2011 | Rajakaruna | B60L 53/305 |
| | | | 320/109 |
| 2016/0357262 A1* | 12/2016 | Ansari | G06Q 10/0833 |

OTHER PUBLICATIONS

Ian Altman, The Good, The Bad and The Ugly of Cost Cutting, published Mar. 2015, Forbes, https://www.forbes.com/sites/ianaltman/2015/03/17/the-good-the-bad-and-the-ugly-of-cost-cutting/?sh=30550ed1377b (Year: 2015).*

J. Nueman, Make Overhead Cuts That Last, published May 1975, Harvard Business Review, https://hbr.org/1975/05/make-overhead-cuts-that-last (Year: 1975).*

\* cited by examiner

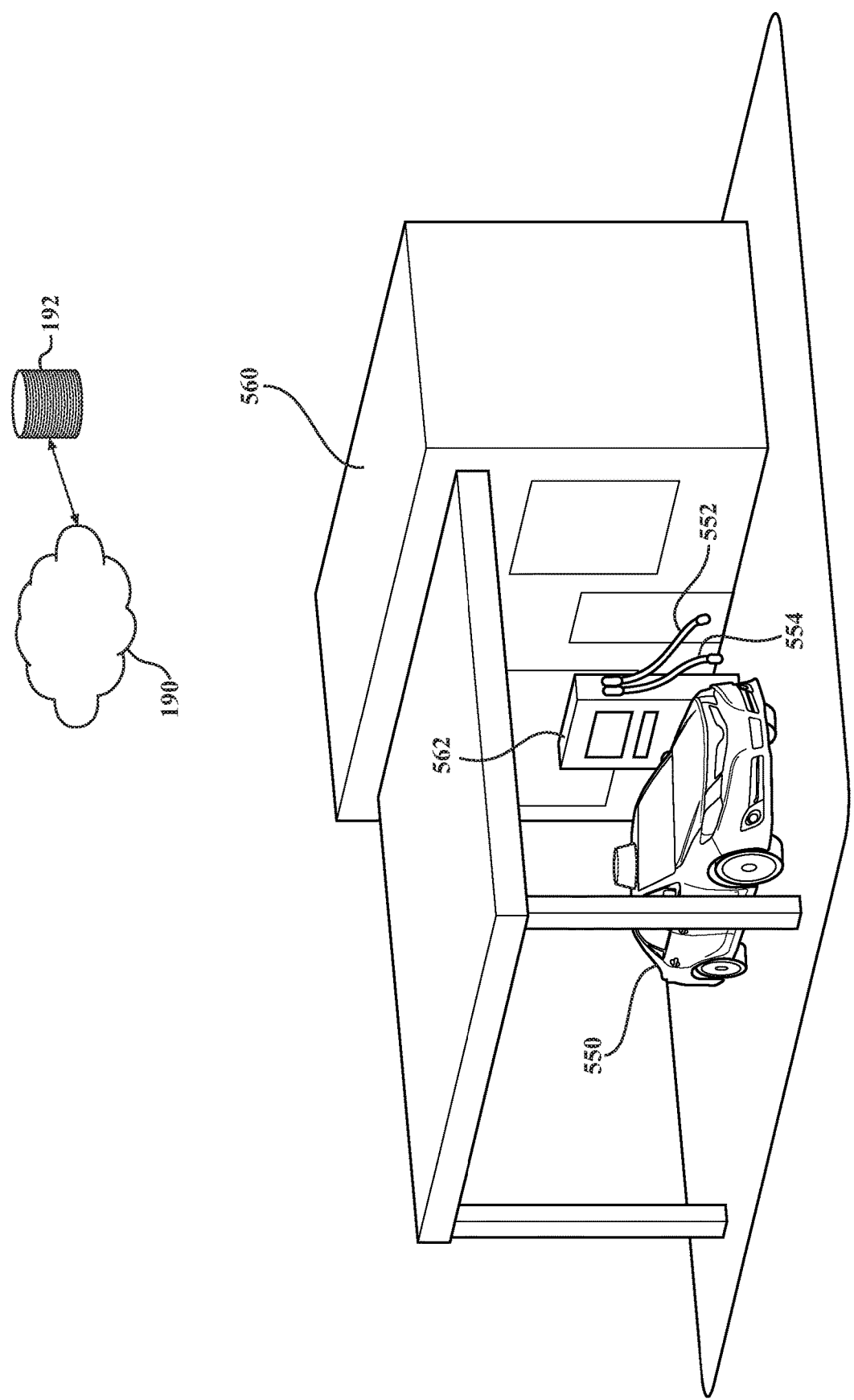

INCENTIVIZED DATA TRANSFER DURING VEHICLE REFUELING

TECHNICAL FIELD

Embodiments described herein generally relate to methods of compensating data transfer. More specifically, the embodiments generally relate to systems and methods of incentivizing data transfer during vehicle refueling or recharging.

BACKGROUND

Many modern vehicles are equipped with a variety of sensors. The sensors, including LiDAR, RADAR, cameras, and others, collect a plethora of information, in a time sensitive manner, about the environments traveled by the vehicle. This information can be used by the vehicle, such as in an object detection or recognition system. Further, this information can be used by outside systems, such as by forming one or more data points for current or future system development. Data transmission takes time from the operator to upload, and is a function of the connection speed. Further, data transmission requires a connection itself, which can be limited depending on the circumstances of the operator, the location of the vehicle, or other factors.

SUMMARY

Systems and methods of incentivizing data transfer during a recharging or refueling process are described herein. In one embodiment, a data compensation system for incentivizing data transfer during vehicle refill is disclosed. The data compensation system can include one or more processors and a memory communicably coupled to the one or more processors. The memory can store a detection module including instructions that when executed by the one or more processors cause the one or more processors to detect a refill event for a collecting vehicle. The memory can further store a valuation module including instructions that when executed by the one or more processors cause the one or more processors to produce a data analysis for one or more operation data sets during the refill event, the one or more operation data sets being produced by the collecting vehicle. The memory can further store a compensation module including instructions that when executed by the one or more processors cause the one or more processors to receive one or more operation data sets from the collecting vehicle, and to provide compensation to the collecting vehicle for the one or more received operation data sets based on the data analysis.

In another embodiment, a non-transitory computer-readable medium for incentivizing data transfer during vehicle refill is disclosed. The non-transitory computer-readable medium can store instructions that when executed by one or more processors cause the one or more processors to detect a refill event for a collecting vehicle. The non-transitory computer-readable medium can further store instructions to produce a data analysis for one or more operation data sets during the refill event, the one or more operation data sets being produced by the collecting vehicle. The non-transitory computer-readable medium can further store instructions to receive one or more operation data sets from the collecting vehicle. The non-transitory computer-readable medium can further store instructions to provide compensation to the collecting vehicle for the one or more received operation data sets based on the data analysis.

In another embodiment, a method for incentivizing data transfer during vehicle refill is disclosed. The method can include detecting a refill event for a collecting vehicle. The method can further include producing a data analysis for one or more operation data sets during the refill event, the one or more operation data sets being produced by the collecting vehicle. The method can further include receiving one or more operation data sets from the collecting vehicle. The method can further include providing compensation to the collecting vehicle for the one or more received operation data sets based on the data analysis.

Embodiments of the present application can be more clearly understood with relation to the figures and the description below.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

FIGS. 5A and 5B depict an operator in a vehicle incorporating the data compensation system, according to embodiments described herein.

To facilitate understanding, identical reference numerals have been used, wherever possible, to designate identical elements that are common to the figures. Additionally, elements of one embodiment may be advantageously adapted for utilization in other embodiments described herein.

DETAILED DESCRIPTION

Many vehicles transfer data via cellular networks or direct connections during downtime. However, direct connections suffer from time limitations and driver permission issues. Specifically, uploading operation data sets to the cloud through direct connection includes taking the car into a special garage and plugging a cable into the vehicle and pushing the operation data sets to the cloud. In further embodiments, uploading the operation data sets can include or taking a hard drive out of the vehicle and shipping it to a secondary location for upload. Relatedly, it is difficult for data rates on cellular to keep up with the amount of data captured by an autonomous vehicle, thus making transfer via wireless network more difficult. The operation data sets are utilized by a variety of systems, such as machine learning algorithms. Further, the operation data sets can be used for a variety of purposes, such as for building better driving models. As such, it is difficult to incentivize someone to do perform this process on a large scale because it is substantial amount of work.

Systems and methods described herein include incentivizing data transfer during a recharging or refueling process. The systems and methods include delivering data into the cloud while the driver receives electricity or fuel into their vehicle. The system and methods then incentivize the transmission by subsidizing the recharging session based on the value of the data. The embodiments described herein create an incentivized system that allows a vehicle manufacturer to receive the operation data sets, such as the driving logs, available from a sensing vehicle while a driver is recharging or refueling their vehicle. The embodiments described herein provide benefit for electric vehicles (EV) or internal combustion vehicles. The level of benefit received can vary based on the time frame, such as an EV uploading data during the recharging process, which takes more time and allows for more data to be uploaded, than an internal combustion vehicle. The compensation can be provided as a discount to the recharge process, real or virtual currency provided to an account or others. In one example, if the cost to recharge a vehicle is an arbitrary value of five (5) and the data was arbitrary value of one (1) then the driver would receive a discount and only pay arbitrary value of four (4) for the charge. Embodiments of the present application can be more clearly understood with relation to the figures and the description below.

Figure 1:
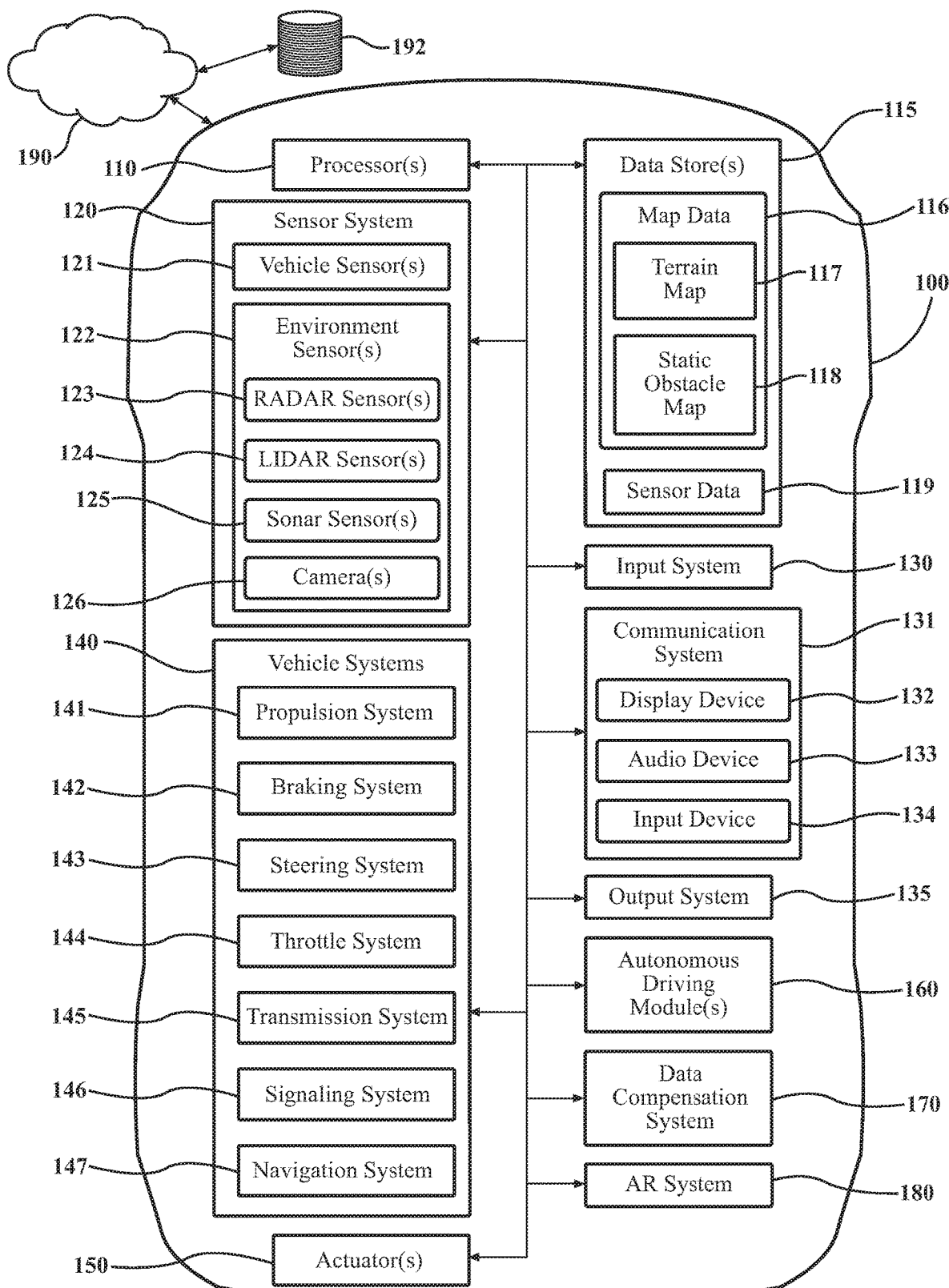
FIG. 1 is a block diagram of a vehicle usable as part of a data compensation system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include a data compensation system 170 or capabilities to support the data compensation system 170, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a more thorough understanding of the embodiments described herein. Those of skill in the art, however, will understand that the embodiments described herein may be practiced using various combinations of these elements.

Figure 2:
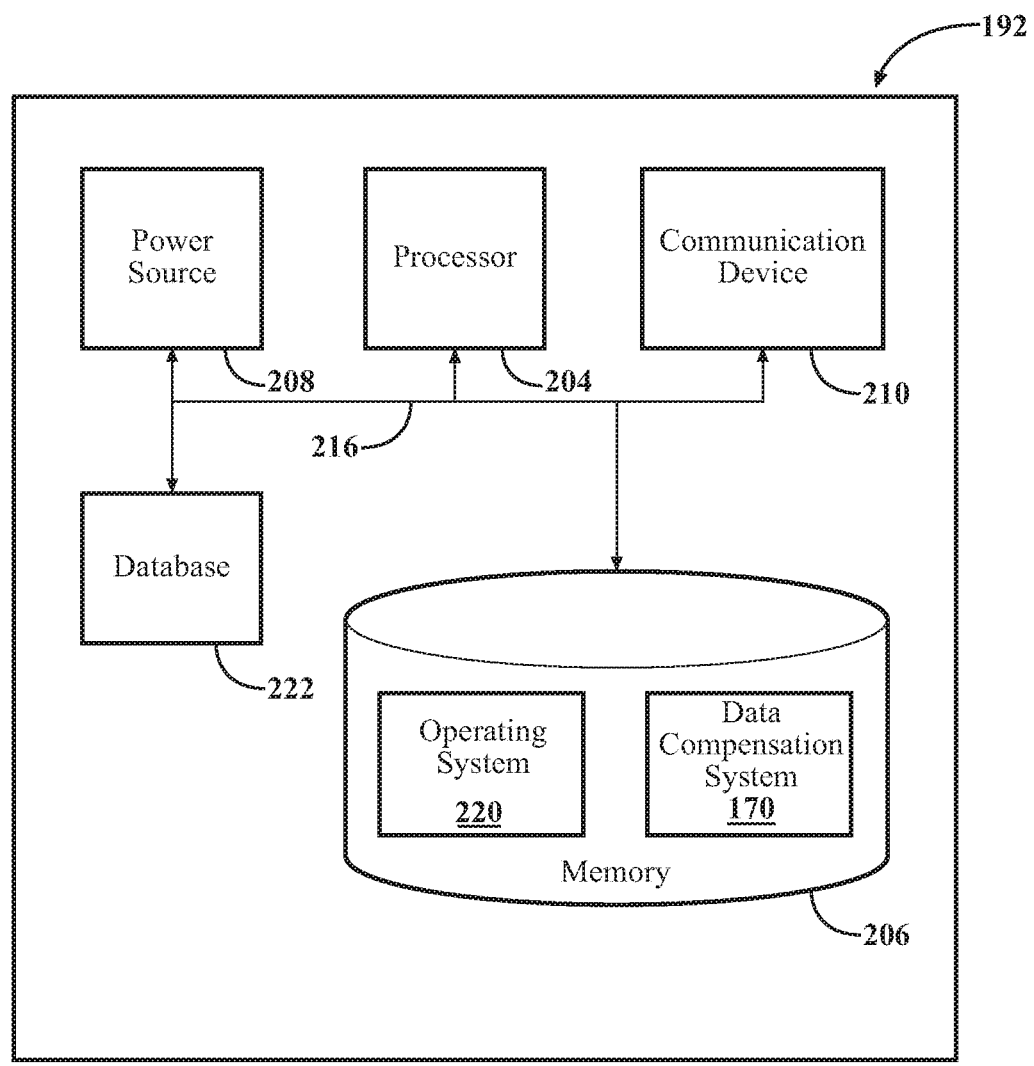
FIG. 2 is a block diagram of a server usable as part of the data compensation system, according to embodiments described herein.

FIG. 2 is a block diagram of the server 192, as shown in FIG. 1, according to one or more embodiments. The server 192 can contain various components for performing the functions that are assigned to said server. The components can include a processor 204, like a central processing unit (CPU), a memory 206, a power source 208, communications device 210, input and/or output devices, and at least one bus 216 that connects the aforementioned components. In some embodiments, these components are at least partially housed within a housing. The processor 204, which can also referred to as a CPU, can be a device which is capable of receiving and executing one or more instructions to perform a task as part of a computing device. In one embodiment, the processor 204 can include a microprocessor such as an application-specific instruction set processor (ASIP), graphics processing unit (GPU), a physics processing unit (PPU), a digital signal processor (DSP), an image processor, a co-processor, or others. Though referenced as the processor 204, it is understood that one or more processors 204 can be used in one or more embodiments described herein, including combinations of processors 204.

The memory 206 can include volatile and/or non-volatile memory. The memory 206 can further include a computer-readable storage medium. Examples of suitable memory 206 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 206 can be a component of the processor(s) 204, or the memory 206 can be operably connected to the processor(s) 204 for use thereby. The memory 206 can include an operating system 220, such as LINUX. The operating system 220 can include batch, live, time sharing, real-time, and other types of operating systems. The operating system 220, as described herein, can include instructions for processing, accessing, writing, storing, searching data, or other functions as selected by the user for controlling and providing interface with the server 192. The memory 206 can include communications procedures for communicating with the network 190, computing devices, a vehicle 100, and/or another server.

The communication device 210 can be wired or wireless connection components and/or software allowing the server 192 to communicate with other computing devices. The communication device 210 can allow communication with devices either locally or remotely, such as over a network protocol (e.g., Ethernet or similar protocols). In one example, the server 192 is connected to the network 190 using the communication device 210. The communication device 210 can further be connected with remote devices associated with other computing devices. In one example, the communication device 210 is connected with the sensors system 120 and the data store 115 through the vehicle 100. In further embodiments, the server 192 can connect with a second server, allowing access to one or more sensors, which are connected to or in connection with the second server. The one or more sensors can include one or more of the sensors of the sensor system 120, described with reference to FIG. 1.

The server 192 can further include the data compensation system 170 or components thereof. As described herein, certain components of the data compensation system 170 can be stored in the vehicle 100, in the server 192 or in combinations thereof. As such, one or more embodiments of the data compensation system 170 can include the data compensation system 170, modules thereof, or components thereof as being stored, collected, created, compared or otherwise made available from the memory 206 or the database 222 of the server 192. When stored as part of the server 192, the data compensation system 170 can access the vehicle 100, another server 192, one or more sensors, or other devices through the communications device 210 and the network 190, allowing for continuity between the one or more components which comprise the data compensation system 170, as disclosed herein.

Figure 3:
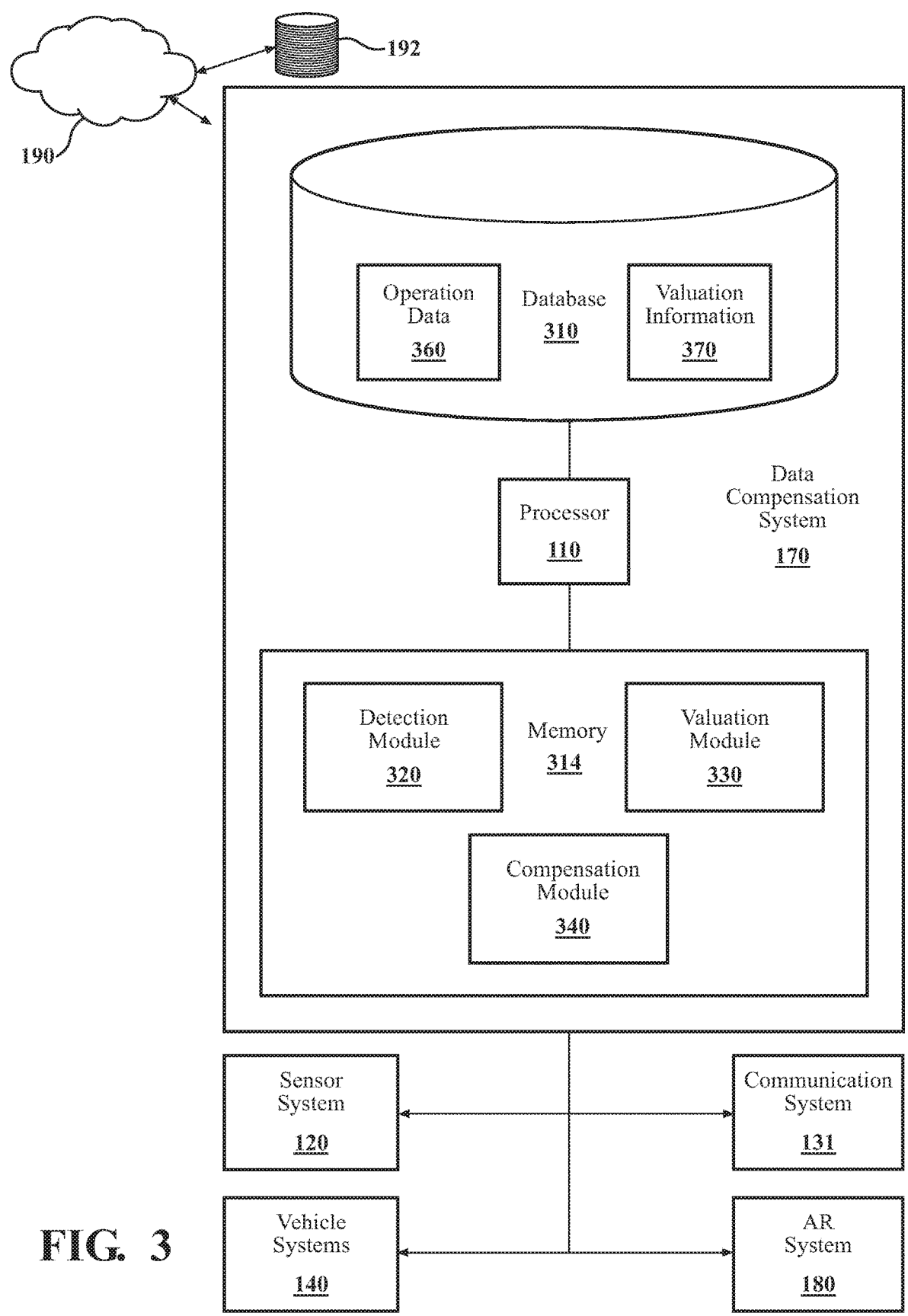
FIG. 3 is an illustration of the data compensation system for incentivizing data transfer during vehicle refill, according to embodiments described herein.

The discussion of the data compensation system 170 begins at FIG. 3, with an illustration of the data compensation system 170, according to one embodiment. The data compensation system 170 is shown as including the processor 110 from the vehicle 100, depicted in FIG. 1. Accordingly, the processor 110 can be a part of the data compensation system 170, the data compensation system 170 can include a separate processor from the processor 110 or the data compensation system 170 can access the processor 110 through a data bus or another communication path. In one embodiment, the data compensation system 170 includes the memory 314 that stores a detection module 320, a valuation module 330 and a compensation module 340. The memory 314 is a RAM, ROM, a hard disk drive, a flash memory, or other suitable memory for storing the modules 320, 330, and 340. The modules 320, 330, and 340 are, for example, computer-readable instructions that when executed by the processor 110, cause the processor 110 to perform the various functions disclosed herein.

The data compensation system 170 can further include a database 310. The database 310 can be presented in a number of configurations, including as part of the memory 314, as an independent component from the memory 314, as part of a separate memory (distinct from memory 314), or others. The database 310 can include operation data 360, valuation information 370. The operation data 360 can include operation data sets as detected or collected from the vehicular environment by one or more sources, such as from a collecting vehicle. The operation data 360 can include one or more operation data sets from remote sensors, as transmitted through a network 190 from a server 192, as well as data collected from one or more on vehicle sensors, such as from a sensor system 120. The valuation information 370 can include information related to types and value of operation data sets collected by one or more collecting vehicles. Though the data compensation system 170 is shown as part of the vehicle 100, the data compensation system 170 or portions thereof, can be stored in a separate vehicle, on a computing device, such as the server 192, or others. As such, one or more of the functions of the data compensation system 170 or the modules contained therein, can be performed remotely and transferred to the collecting vehicle, such as the vehicle 100, as part of the embodiments described herein.

The detection module 320 can generally include instructions that function to control the processor 110 to detect a refill event for a collecting vehicle. The collecting vehicle is a vehicle which includes one or more sensors capable of collecting information from the environment. The environment can be a vehicular environment, described here as an environment that is configured for and/or used primarily by vehicles. The collecting vehicle can collect the one or more operation data sets about the environment using one or more sensors, such as the sensor system 120 of the vehicle 100. The one or more operation data sets can be a data set collected by one or more vehicles about one or more objects in a vehicular environment. In another embodiment, the one or more operation data sets can be collected by a sensor source in the environment. The collecting vehicle can collect sensor data in the vehicular environment while performing other functions, such as autonomous driving. The operation data sets can further include data collected from one or more systems of the collecting vehicle, such as data collected from the vehicle systems 140 of the vehicle 100. The one or more operation data sets can be collected and stored as part of the operation data 360, as stored in the database 310. The one or more operation data sets can be collected regarding one or more objects in the vehicular environment. The objects are the distinct components which make up the vehicular environment, such as street signs, rocks, foliage, roads, and others. In one or more embodiments, the one or more operation data sets can be collected over a period of time from a variety of sources, including a variety of sensor types.

When the collecting vehicle is ready for refilling, as determined by the operator or one or more systems in the collecting vehicle, the detection module 320 can further include instructions to detect said need or desire for refueling. Refilling, as used herein, includes any event where the vehicle receives refueling or recharging such that the collecting vehicle can continue to operate in one or more ways. The collecting vehicle can provide an indication to the detection module 320 that the vehicle will refill. The indication can include a wired or wireless transmission. In one example, the indication is a wireless transmission in response to setting a course for a refill station or entering proximity of a refill station. In another example, the indication is a wired transmission in response to inserting a connector for refueling or recharging at the refill station. In further embodiments, the detection module 320 can determine that the collecting vehicle is traveling to a refill station, such as based on operator habit (e.g., certain times of day, proximity to certain refill stations, fill level of the collecting vehicle, or others). In one embodiment, the detection module 320 can determine that the collecting vehicle will refill based on one or more vehicle models and/or one or more driver models. In another embodiment, the detection module 320 can detect the refill event based on connection to the collecting vehicle during the refill event (e.g., the refill event has begun).

Once the refill determination is made, the valuation module 330 can generally include instructions that function to control the processor 110 to prepare a data analysis from the operation data set. As the data analysis may be received by a wired or wireless connection, the collecting vehicle can have started the refill process during this time or at any time hereafter. As such, the collecting vehicle can be connected to an extension as well as the recharging or refueling connector. The data analysis can include one or more indications about the operation data set, including location, time frame, types of data available, correlation to existing operation data sets, or others. In one example, the data analysis can include number of disengagements, number of traffic signs detected, number of minutes under rain, or others as desired. The data analysis can be prepared by the valuation module 330 at the collecting vehicle, such as the vehicle 100. In further embodiments, the data analysis can be performed by a computing device, such as the server 192, based on a series of inputs from the collecting vehicle. The inputs can include global positioning system (GPS) data, specific data points, timing of the collections, or others. The data analysis can include a plurality of data sub analyses, indicating parameters of specific subgroups of data. As well, the data analysis can be performed in light of one or more indicators regarding desired data or data value. The data analysis can be stored as part of the valuation information 370 in a database, such as the database 310.

Then, the valuation module 330 can further include instructions to receive the data analysis for the one or more operation data sets during the refill event. As described above, the data analysis can be produced by the collecting vehicle, such as the vehicle 100, a computing device, such as the server 192, or combinations thereof. The data analysis can be received by the data compensation system 170, such as by the server 192 having one or more modules of the data compensation system 170 stored therein. In some embodiments, the collecting vehicle and the computing device each have the valuation module 330 incorporated therein. As such, the valuation module 330 of the collecting vehicle can transfer the data analysis for the operation data set to the valuation module 330 of the computing device. The data analysis, or one or more components thereof, can be transmitted wirelessly or by wired connection, as described above.

Then, the valuation module 330 can optionally further include instructions to determine a data value from the data analysis. The data value is a valuation for the data in light of usefulness. The data value can be based on rarity of one or more events covered by the data, location of the data, need or desire for a variety of data points, expected utility at a future point, the source sensor for the data, or other parameters. The data value can be given as a monetary value, as a point value, as a percentile deduction from a fuel cost, or other forms. The valuation module 330 can further include instructions to offer different values for portions of the operation data set based on data sub analyses. In some embodiments, the operation data sets can be determined to have no value, such as corrupted data sets, operation data sets which are relatively overrepresented or mundane, or data sets which are otherwise not usable. In these cases the data value can be set to have zero value or a minimum valuation. The data value can further be based on the time for transfer, such that both the usefulness of the operation data set and the time expense are considered in the valuation. The data value can be stored as part of the valuation information 370 in a database, such as the database 310.

The compensation module 340 can generally include instructions that function to control the processor 110 to receive one or more operation data sets from the collecting vehicle. The operator can use a communication system, such as the communication system 131, the augmented reality (AR) system 180, or combinations thereof described with reference to the vehicle 100 of FIG. 1, to provide one or more inputs regarding which operation data sets will be transferred. In some embodiments, the inputs can be decided based on a set of parameters controlled by the data compensation system 170, by the operator, or combinations thereof. The inputs can be received by the compensation module 340 through operator input in the communications system 131, such as a button console located in the dashboard. The communication system 131 can include a display device 132, an audio device 133, or an input device 134. The inputs can be used for direct selection or to establish parameters for automatic upload. In one example, the operator can select inputs for uploading all data over a certain value or at a certain percentage of the normal value. In further embodiments, the inputs can be selected based on the specific valuations for the operation data sets of the data analyses. The collecting vehicle can then upload the selected data sets to a computing device, such as the server 192. The upload can be initiated by a combination of the operator input and beginning the refill event. The selected data sets can be uploaded through a wired or wireless connection to a network 190. The network 190 can then convey said operation data sets to the server 192 for storage or further processing.

The compensation module 340 can further provide instructions to provide compensation to the collecting vehicle for the received operation data sets based on the data analysis. Though described with reference to the collecting vehicle, it is understood that the compensation can be associated to the collecting vehicle, the owner, the current operator, or another party as desired. The collecting vehicle or other party can have an associated account. The associated account can be a numerical indication of the party which will benefit from the transaction. The operator, through the collecting vehicle, can be notified of the transfer through the communication system, such as the communication system 131, the AR system 180, or combinations thereof described with reference to the vehicle 100 of FIG. 1. The associated account can be updated with the commensurate compensation based on the data analysis, the data value, or combinations thereof. The associated account can be used both for receiving the compensation and for paying for the refill and/or for dispensing the compensation as received. In some embodiments, the associated account exists only for a single event, such that the compensation can be directed to the refill event. In further embodiments, the compensation can be used for other purposes, such as purchases online, credits toward rewards, or for other compensation schemes as desired by the data compensation system 170. One skilled in the art will understand the variety of compensations available and the permutations of said systems without further explicit recitation of examples herein.

In one example of the data compensation system 170, an extension for a collecting vehicle, such as a data cable, is connected as part of the fueling process. The extension, which creates a detection by the detection module 320, can be in addition to the refill device (e.g., a recharge cable or a fuel line) or integrated into the refill device. In the case of an account, the payment for the refill event can be handled by this account and charge station to connect a data cable (or they may both plug in with the same socket). The extension can, in some embodiments, include a wireless connection.

A computing device can be located at a secondary location, such as at the charge station or integrated into the vehicle. The computing device can process the operation data sets and collect metrics necessary to compute the value of the data (i.e., the data analysis). The computing device can then communicate with valuation module of the server 192 through the network 190, such as for updating a model, for confirming the value of one or more operation data sets, for real-time updating of value or others. The operation data sets can then be cached at the charge station, such as for direct or compressed upload of the operation data sets to the server 192.

In another embodiment, the data compensation system 170 could approve the operation data set to confirm the data value and the operator of the collecting vehicle. Then the collecting vehicle could upload the operating data sets from a second location, such as home, if the storage is backed up. In this example, the operator would receive the discount from the compensation module 340 as soon as the operating data set was uploaded. The compensation module 340 can then assign a compensation value to the operating data sets. The compensation module 340 can be stored as part of a data store in the server that the charge station communicates with. The compensation module 340 can communicate with a payment source, such as an operator account, the charge station, a credit card company, or others.

In another embodiment, the compensation module 340 can include instructions for providing selected data parameters to the collecting vehicle. The selected data parameters are one or more parameters which are selected for increased value by the data compensation system 170. In one embodiment, the selected data parameters are data types or specific information which is of limited availability to the data compensation system 170 (e.g., information from a specific poorly traveled intersection, specific types of car accident information, or others.). The collecting vehicle can then use the selected data parameters to decide what information to collect during a route. In further embodiments, the collecting vehicle can even change the route itself to correspond to better data collection based on the selected data parameter.

The compensation module 340 can then issue the compensation to the payment source such that the operator can receive a reduced cost for the refill event. In further embodiments, the compensation module 340 can further communicate with an artificial intelligence system, such as a machine learning infrastructure. In this way, the compensation module, 340, using the artificial intelligence system, can learn new values from operation data sets. In a further embodiment, the operation data sets can be stored by the data compensation system 170 for a period of time, such as when the operation data sets lose value or gain value based on temporal events.

Figure 4:
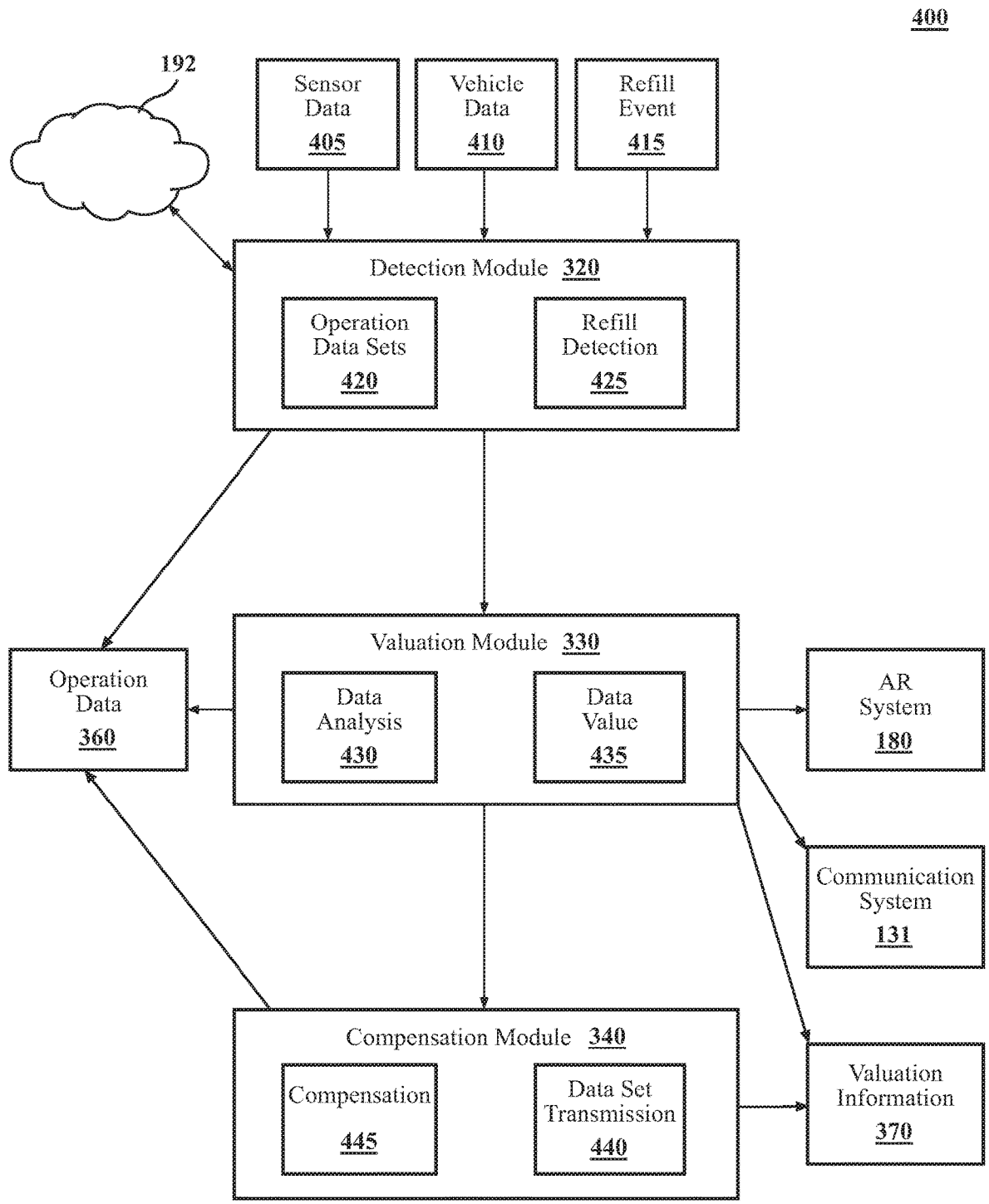
FIG. 4 is a schematic of the data compensation system, according to one or more embodiments.

FIG. 4 depicts a schematic 400 of the data compensation system 170, according to one or more embodiments. The data compensation system 170 incentivizes the transmission of operation data sets, during a refill event, using compensations based on data valuation. The collecting vehicle, as they move through the environment, collects operation data sets, which can include sensor data from at least one sensor, vehicle systems data, or others. The data compensation system 170 can then determine the value of the one or more operation data sets based on a variety of parameters, and provide this valuation to the operator. The operator can then determine which, if any operation data sets to transmit, where the data compensation system 170 provides compensation based on the value of the transferred operation data sets. Thus, the data compensation system 170 can motivate the transmission of operation data sets from an operator, thus avoiding lost data or untimely data transmission which can be valuable to further data metrics and system development.

The schematic 400 of the data compensation system 170 can begin with the sensor data 405 being received by the detection module 320. The sensor data 405 is data collected about the vehicle or the environment from one or more sensors, such as the sensor system 120 of the vehicle 100. The vehicle data 410 is data collected about the vehicle systems, including received data from secondary sources, such as GPS localization of the vehicle. The sensor data 405 and the vehicle data 410 can be incorporated into the one or more operation data sets 420. The one or more operation data sets 420 are the data sets which are collected about the environment and the collecting vehicle during operation, as described above. The one or more operation data sets 420 can be a culmination of the data from all sources. In another embodiment, the one or more operation data sets 420 can be individual collections of data, organized based on one or more parameters. Parameters can include the systems or components of the vehicle and/or the environment, specific objects detected or interacted with, or others. The detection module 320, as described above, can include instructions to collect the operation data sets 420 through the collecting vehicle. As such, the operation data set 420 can be collected by the detection module 320 for further processing by the data compensation system 170.

The detection module 320 can further include instructions to detect a refill event 415 from the collecting vehicle. In embodiments where the detection module is stored as part of the computing device, such as the server 192, the detection module 320 can make a determination regarding the refill event 415 (e.g., a refill detection 425), based on vehicle actions or information which indicates the collecting vehicle will be coming to or is in transit to a refill station, described above with reference to FIG. 3. In further embodiments, where the detection module 320 is stored as part of the collecting vehicle, such as the vehicle 100, the detection module 320 can make the refill detection 425 based on internal indicators of a need or desire to refill the collecting vehicle, described above with reference to FIG. 3. The refill detection 425 can then be forwarded to the valuation module 330.

The valuation module 330 can then receive or produce a data analysis 430 of the operation data sets 420. In one or more embodiments, the valuation module 330 can be incorporated in the collecting vehicle and/or the computing device, as described above. All modules of the data compensation system 170 can be connected within the collecting vehicle, within the computing device, through the network 190, or combinations thereof. As such, the data analysis 430 can be performed at the collecting vehicle and/or the computing device, depending on the location of the valuation module 330. In one embodiment, with the valuation module 330 in the collecting vehicle, the operation data set 420 can be directly analyzed for the data analysis. In another embodiment, with the valuation module 330 stored in the computing device, the valuation module 330 can analyze sample data points received from the collecting vehicle regarding the operation data sets to perform the data analysis 430. The valuation module 330 can further receive or use one or more analysis inputs regarding characteristics which are of interest to the data compensation system 170 for the data analysis 430. The data analysis 430 can then be stored as part of the operation data 360, as described above.

The valuation module 330 can then use the data analysis for creating a data value 435. The data value 435 provides a valuation of the data based on a variety of indicators. In some embodiments, the data value 435 can be cumulative for all operation data sets 420, individualized for each of the operation data sets 420, individualized for specific types of data points, regardless of the operation data sets 420 (e.g., a specific value or enhanced value for any of the operation data sets which includes the data point), or others. The data value 435 can then be stored as part of the valuation information 370, as described above. Further, the data value 435 can then be forwarded to the compensation module 340 as well as being provided to the operator through the communications system 131 and the AR system 180.

The compensation module 340 can then receive input from the operator regarding which of the operation data sets 420 will be transmitted (e.g., the data set transmission 440). The data set transmission 440 can be transmitted and stored locally, such as at the refill station, or transmitted directly to the computing device, such as the server 192. The data set transmission 440 can be substantially similar to the transmitted data sets described above with reference to FIG. 3.

The compensation module 340 can further forward the compensation 445 to the operator and/or the collecting vehicle. The compensation 445 can be in any form of compensation or remuneration acceptable to all parties, including virtual or real currency, discounts, goods or services, or others. The compensation 445 can be transferred to an account, which may be associated with the operator, the collecting vehicle, another party, or combinations thereof. Further, the compensation 445 can be transferred to a third party in response to a debt, such as a debt incurred for refilling the collecting vehicle at the refill station.

As such the data compensation system 170 provides numerous benefits to sensor-equipped vehicles in a vehicular environment and to the recipient systems. First, the data compensation system 170 provides a benefit to the operator in the form of money, goods, or services. Further, the data compensation system 170 provides information through operation data sets that would otherwise not be available to the recipient system. Finally, the data compensation system 170 allows for improvement in preexisting systems based on said data sets.

Figure 5A:
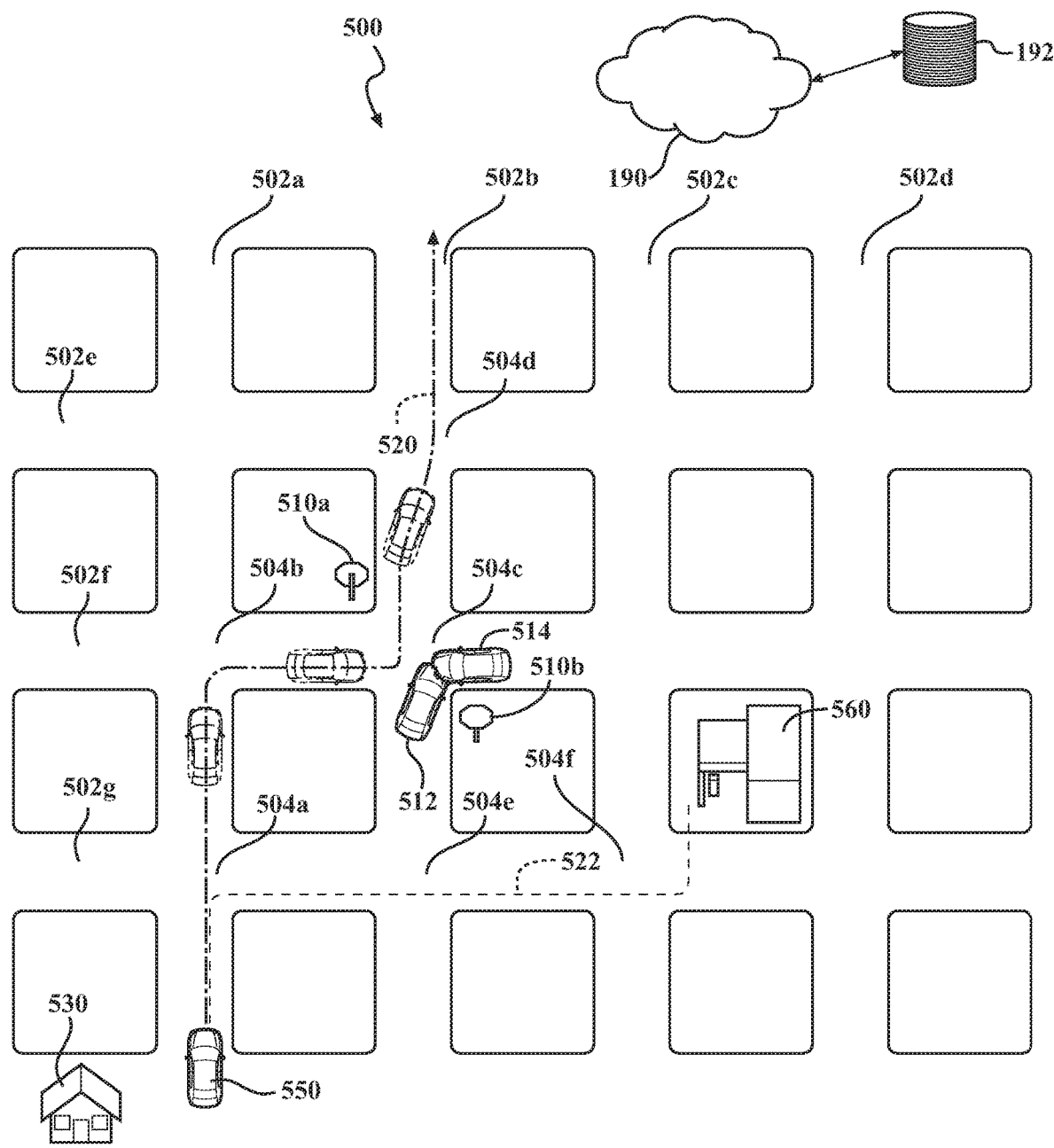

FIGS. 5A and 5B depict a collecting vehicle 550 in a vehicular environment 500 and employing the data compensation system 170, according to one or more embodiments. FIG. 5A depicts the collecting vehicle 550 moving through intersecting roads 502a-502g in the vehicular environment 500, according to one or more embodiment. FIG. 5B depicts the collecting vehicle 550 at a refill station 560 in the vehicular environment 500, according to one or more embodiments. In FIG. 5A, the vehicular environment is shown being detected by the collecting vehicle 550. The collecting vehicle 550 can be substantially similar to the vehicle 100, described with reference to FIG. 1, including any or all elements described therein. In this embodiment, the collecting vehicle 550 is depicted as an autonomous vehicle. The vehicular environment 500 can include intersecting roads 502a-502g and intersections 504a-504f. The intersections 504a-504f are traversed by the collecting vehicle 550 during movement along the first route 520 and/or the second route 522. The collecting vehicle 550 is shown starting at the house 530 on the road 502a, approaching the intersection 504a of the road 502a and the road 502g.

The collecting vehicle 550 collects one or more operation data sets from the vehicular environment 500. As the collecting vehicle 550, follows the first route 520, the collecting vehicle 550 uses instructions from the detection module 320 to collect the one or more operation data sets from the roads 502a, 502b, 502e, 502f and 502g based on visibility of various objects on said roads and position of the collecting vehicle 550. The collecting vehicle 550 collects data sets as available by a first route 520, and as available about the collecting vehicle 550, as part of the one or more operation data sets. As such, the one or more operation data sets can include the second route 522, including road markings, and a first stop sign 510a and the second stop sign 510b which define the traffic patterns of the intersection 504c. In this example, the collecting vehicle 550 collects the operation data sets over a period of days or weeks. During one instance of following the first route 520, the collecting vehicle 550 detects an accident involving a first vehicle 512 and a second vehicle 514. The first vehicle 512 and the second vehicle 514 were involved in a front end collision. The collecting vehicle 550, using an autonomous driving module, such as the autonomous driving module 160 described with reference to FIG. 1, avoids the accident in the intersection 504c to continue on the first route 520. During this time, the collecting vehicle 550, using the detection module 320, collects information on said accident and the behaviors of the collecting vehicle 550 and stores the information as part of the operation data set.

Once the collecting vehicle 550 is ready to refuel, the collecting vehicle 550 follows the second route 522. The detection module 320, as stored in the collecting vehicle 550 or in the server 192 detect that the second route 522 is only followed when the vehicle is ready to refill. Thus, the detection module 320 records a refill event from the collecting vehicle 550. Meanwhile, the collecting vehicle 550 is collecting information regarding the second route 522 which can further be incorporated into the operation data set. The second route 522 includes at least a portion of the roads 502a, 502b, 502c, and 502g. In this example, at least a portion of the detection module 320 is stored in the server 192 and at least a portion of the detection module 320 is stored in the collecting vehicle 550. In this example, the collecting vehicle 550 transmits information regarding position or destination for a refill detection by the detection module 320, as stored in the server 192. The detection module 320 then forwards the refill detection to the valuation module 330.

The collecting vehicle 550 can move into the refill station 560 before, during or after the refill detection is transmitted, as shown in FIG. 5B. At this point, the collecting vehicle 550 can be connected with the receptacle 562 of the refill station 560. The receptacle 562 can include a connection 552 and a refill line 554. The connection 552 can be an information port which connects to the vehicle 550 to create a secondary network connection between the network 190 and the collecting vehicle 550. In some embodiments, the connection 552 can allow for a faster transmission of information and data than the preexisting connections with the collecting vehicle 550. The connection 552, though shown here as a wired connection, can be a wired or wireless connection. The refill line 554 can be a recharging connection or refueling connection for the collecting vehicle 550. The valuation module 330 can then apply the data or the metadata of the operation data sets to create a data analysis, as described above. In the example here, the valuation module 330 in the collecting vehicle 550 prepares the data analysis. The valuation module 330 can then connect with the server 192 through the network 190 to transfer the data analysis. Though the server 192 is described as being a single server, the server 192 can be a network of servers, each of which having components as described in the server 192 to perform the functions described herein. Further, the server 192 can be stored, in part or in whole, at the refill station 560.

Once the data analysis is received or prepared by the valuation module 330 of the server 192, the valuation module 330 can determine a data value for the operation data sets. The data value can be established based on the parameters described above, with reference to FIG. 3. In this example, the collecting vehicle 550 has collected information on a desired event (the accident involving the first vehicle 512 and the second vehicle 514, hereinafter the desired data set). As such, the desired data set can receive a data value that is higher than the remaining data sets. In this case, we presume that the data sets from the collecting vehicle 550 are largely the same. Thus, the remaining operation data sets are of limited value after a certain number of them have been collected. The valuation data can then be presented to the collecting vehicle 550. In one embodiment, the operator of the collecting vehicle 550 can select which of the operation data sets to upload. In another embodiment, the collecting vehicle 550 can select which operation data sets to send based on operator defined parameters (e.g., data sets of a certain value only).

Once the data sets are selected, the collecting vehicle 550 can then upload the data to the server 192. As shown here, the collecting vehicle 550 is connected to the connection 552. The collecting vehicle 550 then transfers the desired data set to the server 192, while not transferring the remaining data sets. In embodiments described herein, the server 192 or the collecting vehicle 550 can initiate the upload of the operation data sets from the collecting vehicle. In one embodiment, the compensation module 340 includes instructions to request data from the collecting vehicle based on the selected operation data sets. In another embodiment, the compensation module 340 uploads from the collecting vehicle 550 based on said selections. The operation data sets can be uploaded during the refill process. The operation data sets can be uploaded through the connection 552, another network connection, or combinations thereof. The operation data sets can be uploaded from the collecting vehicle 550 to the refill station 560 for later uploading to a server 192. The operation data sets can be compressed or otherwise manipulated prior to uploading to the server 192. In further embodiments, the operation data sets can be marked for uploading at a later time.

The server 192, using the compensation module 340, can further provide compensation to the operator or to the collecting vehicle 550, in response to the selection or the transfer of the operation data set. The compensation module 340 can provide compensation based on the value transferred or to be transferred. The compensation can be provided as described above with reference to FIG. 3. In this example, the compensation module 340 receives the desired data set from the collecting vehicle and provides a discount to the refill based on the data value. The compensation can be received during the refill event or after, based on the terms agreed to by the parties. Once the data upload is complete and the collecting vehicle 550 is refilled, the collecting vehicle 550 can continue on the second route 522, redirect to the first route 520, or otherwise leave the refill station 560.

In one or more embodiments, the collecting vehicle 550 can use the data values to determine future data collections. In situations where storage is limited or where the sensors are not capable of collecting all data at once, the collecting vehicle 550 can collect data based on data determined to be more valuable by the valuation module 330. In this instance, the valuation module can provide an indication as to which types of data are more valuable or specific locations which are of more value than others.

The data compensation system 170 can thus provide numerous benefits for the vehicles in the vehicular environment. The data compensation system 170 allows for desired data sets to be collected more efficiently and in a way that benefits all parties involved. Further, the collecting vehicle 550 can use features from the operation data set to collect data based on the needs or desires of the end user or system. In this way, the one or more operation data sets collected by the collecting vehicle 550 can be of higher quality or greater importance to future use.

Figure 6:
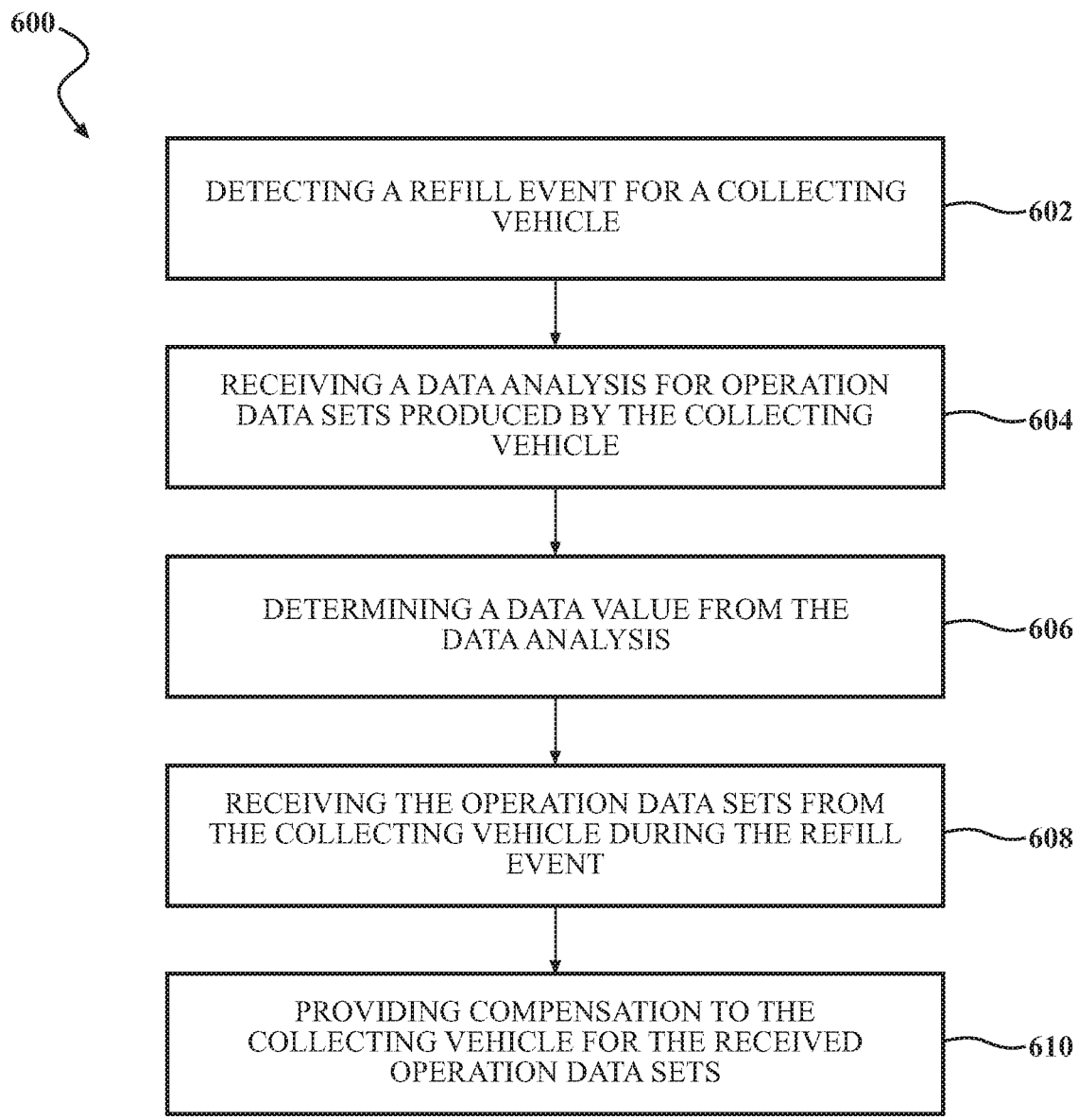
FIG. 6 is a block diagram of a method for incentivizing data transfer during vehicle refill, according to one or more embodiments.

FIG. 6 is a block diagram of a method 600 for incentivizing data transfer during vehicle refill, according to one or more embodiments herein. The method 600 provides compensation to an operator for data transferred during or related to a refill event. In this way, the operator can choose the time to spend based on the value of the data while the systems which rely on the data are more likely to receive the data from the operator. Thus, the method 600 provides motivation for the operator to be involved in data transfers during a recharge event. As described herein, the method 600 can include detecting a refill event for a collecting vehicle, at 602. Then, a data analysis can be produced for one or more operation data sets during the refill event, the one or more operation data sets being produced by the collecting vehicle, at 604. One or more operation data sets can then be received from the collecting vehicle, at 606. Then, compensation can be provided to the collecting vehicle for the received operation data sets based on the data analysis, at 608.

The method 600 can include detecting a refill event for a collecting vehicle, at 602. The collecting vehicle can be a vehicle as described with reference to FIGS. 1 and 3. Prior to detecting the refill event, the collecting vehicle can collect the one or more operation data sets about the vehicular environment. The one or more operation data sets can be a data set collected by one or more vehicles about one or more objects in a vehicular environment and/or from one or more systems of the collecting vehicle. In one or more embodiments, the one or more operation data sets can be collected over a period of time from a variety of sources, including a variety of sensor types. The collecting vehicle can then provide an indication to the method 600 that the vehicle will refill, such as a wireless transmission in response to setting a course for a refill station or entering proximity of a refill station. In further embodiments, the indication can be a wired transmission in response to inserting a connector for refueling or recharging at the refill station. In further embodiments, the method 600 can determine that the collecting vehicle is traveling to a refill station, such as based on operator habit. In another embodiment, the method 600 can determine that the collecting vehicle will refill based on one or more vehicle models and/or one or more driver models. In another embodiment, the method 600 can detect the refill event based on connection to the collecting vehicle during the refill event.

The detection of a refill event for the collecting vehicle can be performed as part of a system, such as the data compensation system 170, described with reference to FIG. 3. The data compensation system 170 can include the detection module 320. The detection module 320 can generally include instructions that function to control the processor 110 to detect a refill event for a collecting vehicle. The one or more operation data sets can be substantially similar to the one or more operation data sets, described with reference to FIGS. 3 and 4. The one or more operation data sets can be collected in a substantially similar fashion to the one or more operation data sets, described with reference to FIGS. 3 and 4. The one or more operation data sets can be collected and stored as part of the operation data 360. The operation data 360 can be stored in a database, such as the database 310, described with reference to FIG. 3.

Then, a data analysis can be produced for one or more operation data sets during the refill event, the one or more operation data sets being produced by the collecting vehicle, at 604. The data analysis can be received by a wired or wireless connection. As such, the collecting vehicle can have started the refill process during this time or at any time hereafter. As such, the collecting vehicle can be connected to an extension as well as to the recharging or refueling connector. The data analysis can include one or more indications about the operation data set, including location, time frame, types of data available, correlation to existing operation data sets, or others. In one example, the data analysis can include number of disengagements, number of traffic signs detected, number of minutes under rain, or others as desired. The data analysis can include a plurality of data sub analyses, indicating parameters of specific subgroups of data. As well, the data analysis can be performed in light of one or more indicators regarding desired data or data value. The data analysis can be stored as part of the valuation information 370 in a database, such as the database 310.

The production or receiving of the data analysis can be performed as part of a system, such as the data compensation system 170, described with reference to FIG. 3. The data compensation system 170 can include the valuation module 330. The valuation module 330 can generally include instructions that function to control the processor 110 to prepare a data analysis from the operation data set. Once the refill determination is made, the data analysis can be prepared by the valuation module 330 at the collecting vehicle, such as the vehicle 100. The data analysis can be performed by a computing device, such as the server 192, based on a series of inputs from the collecting vehicle. The inputs can include GPS data, specific data points, timing of the collections, or others. The data analysis can be substantially similar to the data analysis, described with reference to FIGS. 3 and 4. The data analysis can be collected and stored as part of the valuation information 370. The valuation information 370 can be stored in a database, such as the database 310, described with reference to FIG. 3.

Optionally, a data value can be determined from the data analysis. The data value is a valuation for the data in light of usefulness. The method 600 can base the data value on rarity of one or more events covered by the operation data set, location of the operation data set, need or desire for a variety of data points, expected utility of the operation data set at a future point, the source sensor for the operation data set, or other parameters. The data value can be given as a monetary value, as a point value, as a percentile deduction from a fuel cost, or other forms. The method 600 can further include instructions to offer different values for portions of the operation data set based on data sub analyses. The data value can further include the time for transfer, such that both the usefulness of the operation data set and the time expense are considered in the valuation.

The determination of data value for the operation data sets can be performed as part of a system, such as the data compensation system 170, described with reference to FIG. 3. The data compensation system 170 can include the valuation module 330. The valuation module 330 can generally include instructions that function to control the processor 110 to determine a data value from the data analysis. Once the refill determination is made, the data analysis can be prepared by the valuation module 330 at the collecting vehicle, such as the vehicle 100. The valuation module 330 can further include instructions to offer different values for portions of the operation data set based on data sub analyses. The data value can be substantially similar to the data value, described with reference to FIGS. 3 and 4. The data value can be collected and stored as part of the valuation information 370. The valuation information 370 can be stored in a database, such as the database 310, described with reference to FIG. 3.

One or more operation data sets can then be received from the collecting vehicle, at 608. The operator can use a communication system to provide one or more inputs regarding which operation data sets will be transferred. The upload can be initiated by a combination of the operator input and beginning the refill event. In further embodiments, the upload can be initiated at a later point, thus allowing the selection of data and the transfer of compensation to occur at a later time. In some embodiments, the inputs can be decided based on a set of parameters controlled by the method 600, by the operator, or combinations thereof. In further embodiments, the inputs can be selected based on the specific valuations for the operation data sets of the data analyses. The collecting vehicle can then upload the selected data sets to a computing device. The method 600 can then upload selected data sets through a wired or wireless connection to a network. The method 600 can then convey said operation data sets to the computing device for storage or further processing.

The receiving of the operation data sets from the collecting vehicle can be performed as part of a system, such as the data compensation system 170, described with reference to FIG. 3. The data compensation system 170 can include the compensation module 340. The compensation module 340 can generally include instructions that function to control the processor 110 to receive one or more operation data sets from the collecting vehicle during the refill event. The inputs can be received by the compensation module 340 through operator input in the communications system 131. The collecting vehicle can then upload the selected data sets to a computing device, such as the server 192. The upload can be initiated by a combination of the operator input and beginning the refill event. The selected data sets can be uploaded through a wired or wireless connection to a network 190. The network 190 can then convey said operation data sets to the server 192 for storage or further processing.

Then, compensation can be provided to the collecting vehicle for the received operation data sets based on the data analysis, at 610. Though described with reference to the collecting vehicle, it is understood that the compensation can be associated to the collecting vehicle, the owner, the current operator, or another party as desired. The collecting vehicle or other party can have an associated account with a numerical indication of the party which will benefit from the transaction. The operator, through the method 600, can be notified of the transfer through the communication system. The associated account can be updated with the commensurate compensation based on the data analysis, the data value, or both. The associated account can be used for a variety of purposes, such as for receiving the compensation, for paying for the refill and/or for dispensing the compensation as received. In some embodiments, the associated account exists only for a single event, such that the compensation can be directed to the refill event. In further embodiments, the compensation can be used for other purposes, such as purchases online, credits toward rewards, or for other compensation schemes as desired by the method 600.

The providing of compensation to the collecting vehicle can be performed as part of a system, such as the data compensation system 170, described with reference to FIG. 3. The data compensation system 170 can include the compensation module 340. The compensation module 340 can generally include instructions that function to control the processor 110 to provide compensation to the collecting vehicle for the received operation data sets based on the data value. The compensation can be received by the compensation module 340 through an account or in response to a debt, such as the cost of a refill. The operator, through the collecting vehicle, can be notified of the transfer through the communication system, such as the communication system 131, the AR system 180, or combinations thereof described with reference to the vehicle 100 of FIG. 1. The selected data sets can be uploaded through a wired or wireless connection to an associated account for present or future purchases.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from an operator (e.g., a human user/driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from an operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the operator is to monitor the driving and be vigilant and ready to intervene with controlling the vehicle 100 if the autonomous driving module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include map data 116 and/or sensor data 119. In this context, "map data" refers to any data providing relative proximity between two objects, usable by the vehicle 100, one or more systems of the vehicle 100, or the operator. "Sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a GPS, a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126 and/or inertial measurement units (IMUs). In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator in order to determine a gaze of the operator, an eye track of the operator, and so on.

The vehicle 100 can include an input system 130. An "input system" includes any device, component, system, element or arrangement or groups thereof that enable information/data to be entered into a machine. The input system 130 can receive an input from a vehicle passenger (e.g., an operator or a passenger) or from external systems, such as from the data compensation system 170, described above with reference to FIG. 2. The vehicle 100 can include an output system 135. An "output system" includes any device, component, or arrangement or groups thereof that enable information/data to be transmitted to the vehicle or presented to a vehicle passenger (e.g. a person, a vehicle passenger, etc.). The output system 135 can be configured to communicate sensor data and other information to the data compensation system 170, as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a GPS, a local positioning system or a geolocation system.

The processor(s) 110, the data compensation system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the data compensation system 170, and/or the autonomous driving module(s) 160 may control some or all of these vehicle systems 140 and, thus, may be partially or fully autonomous.

The processor(s) 110, the data compensation system 170, and/or the autonomous driving module(s) 160 can be operably connected to communicate with the various vehicle systems 140 and/or individual components thereof. For example, returning to FIG. 1, the processor(s) 110, the data compensation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the data compensation system 170, and/or the autonomous driving module(s) 160 may control some or all of these vehicle systems 140.

The processor(s) 110, the data compensation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the data compensation system 170, and/or the autonomous driving module(s) 160 can control the direction and/or speed of the vehicle 100. The processor(s) 110, the data compensation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the data compensation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140). The noted functions and methods will become more apparent with a further discussion of the figures.

The vehicle 100 can further include an AR system 180. It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the data compensation system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A data compensation system for incentivizing data transfer during vehicle refill, comprising:
   one or more processors; and
   a memory communicably coupled to the one or more processors and storing:
      a detection module including instructions that when executed by the one or more processors cause the one or more processors to detect a refill event for a collecting vehicle by detecting, using sensor data, a connection between the collecting vehicle and a refueling connector or a recharging connector at a refill station;
      a valuation module including instructions that when executed by the one or more processors cause the one or more processors to produce a data analysis for one or more operation data sets during the refill event, the one or more operation data sets being produced by the collecting vehicle, and to determine a data value from the data analysis, the data value being based on at least one of: rarity of one or more events covered by the operation data, location of the operation data, variety of data points, expected utility of the operation data at a future point, or source sensor for the operation data, the data value being further based on an amount of time for data transfer; and a compensation module including instructions that when executed by the one or more processors cause the one or more processors to:
  receive the one or more operation data sets from the collecting vehicle by a data cable located at the refill station, the data cable creating a secondary network connection with the collecting vehicle, the data cable being a physical structure and being integrated into a refill device;
  provide compensation to the collecting vehicle for the one or more received operation data sets based on the data analysis, the compensation being provided in response to receiving an input regarding selection of one or more operation data sets and to detecting the connection between the collecting vehicle and the refueling connector or the recharging connector at the refill station or to detecting the connection between the collecting vehicle and the data cable, the compensation being provided as a discount to the refill event, real currency, or virtual currency; and
  communicate with an artificial intelligence system to learn from the one or more operation data sets.

2. The data compensation system of claim 1, wherein detect the refill event includes receiving input from the collecting vehicle regarding a need for refill.

3. The data compensation system of claim 1, wherein the detection module further comprises instructions to request production and transmission of the data analysis from the collecting vehicle.

4. The data compensation system of claim 1, wherein the compensation module further comprises instructions to provide compensation in response to an input regarding selection of the one or more operation data sets and connection of the collecting vehicle to a refill device.

5. The data compensation system of claim 1, wherein the compensation module further comprises instructions to present one or more selected data parameters to the collecting vehicle.

6. The data compensation system of claim 5, wherein the collecting vehicle collects the one or more operation data sets in response to the selected data parameters.

7. A non-transitory computer-readable medium for incentivizing data transfer during vehicle refill and storing instructions that when executed by one or more processors cause the one or more processors to:
  detect a refill event for a collecting vehicle by detecting, using sensor data, a connection between the collecting vehicle and a refueling connector or a recharging connector at a refill station;
  produce a data analysis for one or more operation data sets during the refill event, the one or more operation data sets being produced by the collecting vehicle;
  determine a data value from the data analysis, the data value being based on at least one of: rarity of one or more events covered by the operation data, location of the operation data, the variety of data points, expected utility of the operation data at a future point, or source sensor for the operation data, the data value being further based on an amount of time for data transfer;
  receive the one or more operation data sets from the collecting vehicle by a data cable located at the refill station, the data cable creating a secondary network connection with the collecting vehicle, the data cable being integrated into a refill device; and
  provide compensation to the collecting vehicle for the one or more received operation data sets based on the data analysis, the compensation being provided in response to receiving an input regarding selection of one or more operation data sets and to detecting the connection between the collecting vehicle and the refueling connector or the recharging connector at the refill station or to detecting the connection between the collecting vehicle and the data cable, the compensation being provided as a discount to the refill event, real currency, or virtual currency.

8. The non-transitory computer-readable medium of claim 7, wherein detect the refill event includes receiving input from the collecting vehicle regarding a need for refill.

9. The non-transitory computer-readable medium of claim 7, further comprising instructions to request production and transmission of the data analysis from the collecting vehicle.

10. The non-transitory computer-readable medium of claim 7, further comprising instructions to provide compensation in response to an input regarding selection of the one or more operation data sets and connection of the collecting vehicle to a refill device.

11. The non-transitory computer-readable medium of claim 7, further comprising instructions to present one or more selected data parameters to the collecting vehicle.

12. The non-transitory computer-readable medium of claim 11, wherein the collecting vehicle collects the one or more operation data sets in response to the selected data parameters.

13. A method for incentivizing data transfer during vehicle refill, comprising:
  detecting a refill event for a collecting vehicle by detecting, using sensor data, a connection between the collecting vehicle and a refueling connector or a recharging connector at a refill station;
  producing a data analysis for one or more operation data sets during the refill event, the one or more operation data sets being produced by the collecting vehicle;
  determining a data value from the data analysis, the data value being based on at least one of: rarity of one or more events covered by the operation data, location of the operation data, variety of data points, expected utility of the operation data at a future point, or source sensor for the operation data, the data value being further based on an amount of time for data transfer;
  receiving the one or more operation data sets from the collecting vehicle by a data cable located at the refill station, the data cable creating a secondary network connection with the collecting vehicle, the data cable being integrated into a refill device; and
  providing compensation to the collecting vehicle for the one or more received operation data sets based on the data analysis, the compensation being provided in response to receiving an input regarding selection of one or more operation data sets and to detecting the connection between the collecting vehicle and the refueling connector or the recharging connector at the refill station or to detecting the connection between the collecting vehicle and the data cable, the compensation being provided as a discount to the refill event, real currency, or virtual currency.

14. The method of claim 13, wherein detecting the refill event includes receiving input from the collecting vehicle regarding a need for refill.

15. The method of claim 13, further comprising requesting production and transmission of the data analysis from the collecting vehicle.

16. The method of claim 13, further comprising providing compensation in response to an input regarding selection of the one or more operation data sets and connection of the collecting vehicle to a refill device.

17. The method of claim 13, further comprising presenting one or more selected data parameters to the collecting vehicle, wherein the collecting vehicle collects the one or more operation data sets in response to the selected data parameters.

\* \* \* \* \*